US009158468B2

(12) United States Patent
Baldwin et al.

(10) Patent No.: US 9,158,468 B2
(45) Date of Patent: *Oct. 13, 2015

(54) HIGH READ BLOCK CLUSTERING AT DEDUPLICATION LAYER

(71) Applicant: INTERNATIONAL BUSINESS MACHINES CORPORATION, Armonk, NY (US)

(72) Inventors: Duane M. Baldwin, Mantorville, MN (US); Clodoaldo Barrera, Morgan Hill, CA (US); Mihail C. Constantinescu, San Jose, CA (US); Sandeep R. Patil, Pune, IN (US); Riyazahamad M. Shiraguppi, Pune, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 271 days.

This patent is subject to a terminal disclaimer.

(21) Appl. No.: 13/732,472

(22) Filed: Jan. 2, 2013

(65) Prior Publication Data
US 2014/0189268 A1 Jul. 3, 2014

(51) Int. Cl.
G06F 12/00 (2006.01)
G06F 13/00 (2006.01)
(Continued)

(52) U.S. Cl.
CPC ............ G06F 3/0641 (2013.01); G06F 3/0604 (2013.01); G06F 3/0608 (2013.01)

(58) Field of Classification Search
CPC .................................................. G06F 3/0641
See application file for complete search history.

(56) References Cited

U.S. PATENT DOCUMENTS 8,051,050 B2 * 11/2011 Popovski et al. ............. 707/692
8,171,253 B2 * 5/2012 Narayanasamy ............. 711/203
8,359,444 B2 * 1/2013 Arakawa ...................... 711/165
(Continued)

FOREIGN PATENT DOCUMENTS

WO WO2010040078 A2 4/2010
WO WO2012042792 A1 4/2012

OTHER PUBLICATIONS

Hard Disk (hard drive) Operation, Pctechguide, May 20, 2011, retrieved from https://web.archive.org/web/20110520002352/http://www.pctechguide.com/hard-disks/hard-disk-hard-drive-operation on Nov. 18, 2014 (4 pages).*

(Continued)

Primary Examiner — Tuan Thai
Assistant Examiner — Daniel C Chappell
(74) Attorney, Agent, or Firm — Griffiths & Seaton PLLC

(57) ABSTRACT

Methods, systems, and computer program products are provided for deduplicating data mapping a plurality of file blocks of selected data to a plurality of logical blocks, deduplicating the plurality of logical blocks to thereby associate each logical block with a corresponding physical block of a plurality of physical blocks located on a physical memory device, two or more of the corresponding physical blocks being non-contiguous with each other, determining whether one or more of the corresponding physical blocks are one or more frequently accessed physical blocks being accessed at a frequency above a threshold frequency and being referred to by a common set of applications, and relocating data stored at the one or more frequently accessed physical blocks to different ones of the plurality of physical blocks, the different ones of the plurality of physical blocks being physically contiguous.

23 Claims, 6 Drawing Sheets

(51) Int. Cl.
*G06F 13/28* (2006.01)
*G06F 3/06* (2006.01)

(56) References Cited

U.S. PATENT DOCUMENTS

| | | | | |
|---|---|---|---|---|
| 8,385,192 | B2* | 2/2013 | Akirav et al. | 370/229 |
| 8,391,140 | B2* | 3/2013 | Akirav et al. | 370/229 |
| 8,407,438 | B1* | 3/2013 | Ranade | 711/165 |
| 8,468,320 | B1* | 6/2013 | Stringham | 711/170 |
| 8,527,544 | B1* | 9/2013 | Colgrove et al. | 707/791 |
| 8,589,640 | B2* | 11/2013 | Colgrove et al. | 711/156 |
| 8,620,962 | B1* | 12/2013 | Strunk et al. | 707/797 |
| 8,682,870 | B1* | 3/2014 | Gardner et al. | 707/692 |
| 8,825,980 | B2* | 9/2014 | Patil et al. | 711/170 |
| 8,930,307 | B2* | 1/2015 | Colgrove et al. | 707/610 |
| 8,959,293 | B2* | 2/2015 | Kalach et al. | 711/154 |
| 9,009,437 | B1* | 4/2015 | Bjornsson et al. | 711/170 |
| 9,015,417 | B2* | 4/2015 | Agrawal et al. | 711/126 |
| 2006/0236056 | A1* | 10/2006 | Nagata | 711/165 |
| 2008/0288560 | A1* | 11/2008 | Kaji et al. | 707/204 |
| 2010/0088296 | A1* | 4/2010 | Periyagaram et al. | 707/705 |
| 2011/0004639 | A1* | 1/2011 | Williams | 707/812 |
| 2011/0055471 | A1* | 3/2011 | Thatcher et al. | 711/114 |
| 2011/0131390 | A1 | 6/2011 | Srinivasan et al. | |
| 2011/0238635 | A1* | 9/2011 | Leppard | 707/693 |
| 2011/0289296 | A1* | 11/2011 | Saito et al. | 711/209 |
| 2012/0054158 | A1 | 3/2012 | Hu et al. | |
| 2014/0122819 | A1* | 5/2014 | Green et al. | 711/162 |
| 2015/0019509 | A1* | 1/2015 | Aronovich | 707/692 |

OTHER PUBLICATIONS

Definition of CPU, Jun. 22, 2009, retrieved from https://web.archive.org/web/20090622135021/http://foldoc.org/CPU on Nov. 10, 2014 (1 page).*

WOW: Wise Ordering for Writes—Combining Spatial and Temporal Locality in Non-Volatile Caches, Gill et al, FAST '05: 4th USENIX Conference on File and Storage Technologies, 2005 (14 pages).*

Tianming Yang et al, "DEBAR—A scalable high-performance de-duplication storage system for backup and archiving", 2010.

* cited by examiner

HIGH READ BLOCK CLUSTERING AT DEDUPLICATION LAYER

BACKGROUND OF THE INVENTION

1. Field of the Invention

The present invention relates in general to data storage, more particularly, to deduplicating data for storage and accessing deduplicated data from the storage.

2. Description of the Related Art

Computing environments increasingly store data in one or more storage environments, which in many cases are remote from the local interface presented to a user. These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

Some storage devices used in the computing environments employ magnetic hard disks. Magnetic hard disks include a disk spindle for holding flat disk platters. Information is written to and/or read from a disk platter as the platter rotates. In particular, an actuator arm moves read-and-write heads on an arc across the platters as they spin to allow each head to access almost an entire surface of the platter. The heads access annular tracks on the platters, which are numbered from an outermost track inward. Each track is divided into sectors to store a fixed amount of data. To manage file storage, file blocks are mapped to logical block units, and the logical block units are mapped to physical blocks on the magnetic hard disks. In this way, file management is maintained independent of storage management.

SUMMARY OF THE INVENTION

In some cases, two or more files include redundant data. As a result, data deduplication processes are performed on the files to delete duplicate data and to store only a single copy of the data. The single copy of the data, referred to as a master copy, is maintained in storage, and files from which the duplicate data have been deleted include reference pointers to the master copy. Typically, the deduplication process causes the logical blocks of the deleted duplicate data to be mapped to any of the physical blocks. Thus, even if an application accesses file blocks sequentially, the file blocks may be mapped to sequential logical blocks, but also mapped to random physical blocks. As a result the physical blocks to which the logical units are assigned may be non-contiguous which can increase input/output (I/O) latencies and reduce I/O performance. Although defragmentation processes improve contiguity of physical blocks, such processes are not applicable when data has undergone deduplication.

Methods, systems, and computer program products are now provided that improve contiguity of the physical blocks that have undergone deduplication. In an embodiment, by way of example only, a method includes mapping a plurality of file blocks of selected data to a plurality of logical blocks, deduplicating the plurality of logical blocks to thereby associate each logical block with a corresponding physical block of a plurality of physical blocks located on a physical memory device, two or more of the corresponding physical blocks being non-contiguous with each other, determining whether one or more of the corresponding physical blocks are one or more frequently accessed physical blocks being accessed at a frequency above a threshold frequency and being referred to by a common set of applications, and relocating data stored at the one or more frequently accessed physical blocks to different ones of the plurality of physical blocks, the different ones of the plurality of physical blocks being physically contiguous.

In an embodiment, by way of example only, a system includes one or more physical memory devices, and a processing device operable with the one or more physical memory devices to map a plurality of file blocks of selected data to a plurality of logical blocks, deduplicate the plurality of logical blocks to thereby associate each logical block with one or more corresponding physical blocks of a plurality of physical blocks located on the one or more physical memory devices, two or more of the corresponding physical blocks being non-contiguous with each other, determine whether one or more of the corresponding physical blocks are one or more frequently accessed physical blocks being accessed at a frequency above a threshold frequency and being referred to by a common set of applications, and relocate data stored at the one or more frequently accessed physical blocks associated to different ones of the plurality of physical blocks, the different ones of the plurality of physical blocks being physically contiguous.

In an embodiment, by way of example only, a computer program product for deduplicating data comprises at least one computer-readable medium having computer-readable code portions including a first executable portion for mapping a plurality of file blocks of selected data to a plurality of logical blocks, a second executable portion for deduplicating the plurality of logical blocks to thereby associate each logical block with a corresponding physical block of a plurality of physical blocks located on a physical memory device, two or more of the corresponding physical blocks being non-contiguous with each other, a third executable portion for determining whether one or more of the corresponding physical blocks are one or more frequently accessed physical blocks being accessed at a frequency above a threshold frequency and being referred to by a common set of applications, and a fourth executable portion for relocating data stored at the one or more frequently accessed physical blocks to different ones of the plurality of physical blocks, the different ones of the plurality of physical blocks being physically contiguous.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below include methods, systems, and apparatus that manage high read physical blocks on a memory device, such as a magnetic hard disk drive, and assign such physical blocks in a contiguous manner during deduplication. More particularly, the invention includes deduplicating data by mapping a plurality of file blocks of selected data to a plurality of logical blocks, deduplicating the plurality of logical blocks to thereby associate each logical block with a corresponding physical block of a plurality of physical blocks located on a physical memory device, two or more of the corresponding physical blocks being non-contiguous with each other, determining whether one or more of the corresponding physical blocks are one or more frequently accessed physical blocks being accessed at a frequency above a threshold frequency and being referred to by a common set of applications, and relocating data stored at the one or more frequently accessed physical blocks to different ones of the plurality of physical blocks, the different ones of the plurality of physical blocks being physically contiguous.

Figure 1:
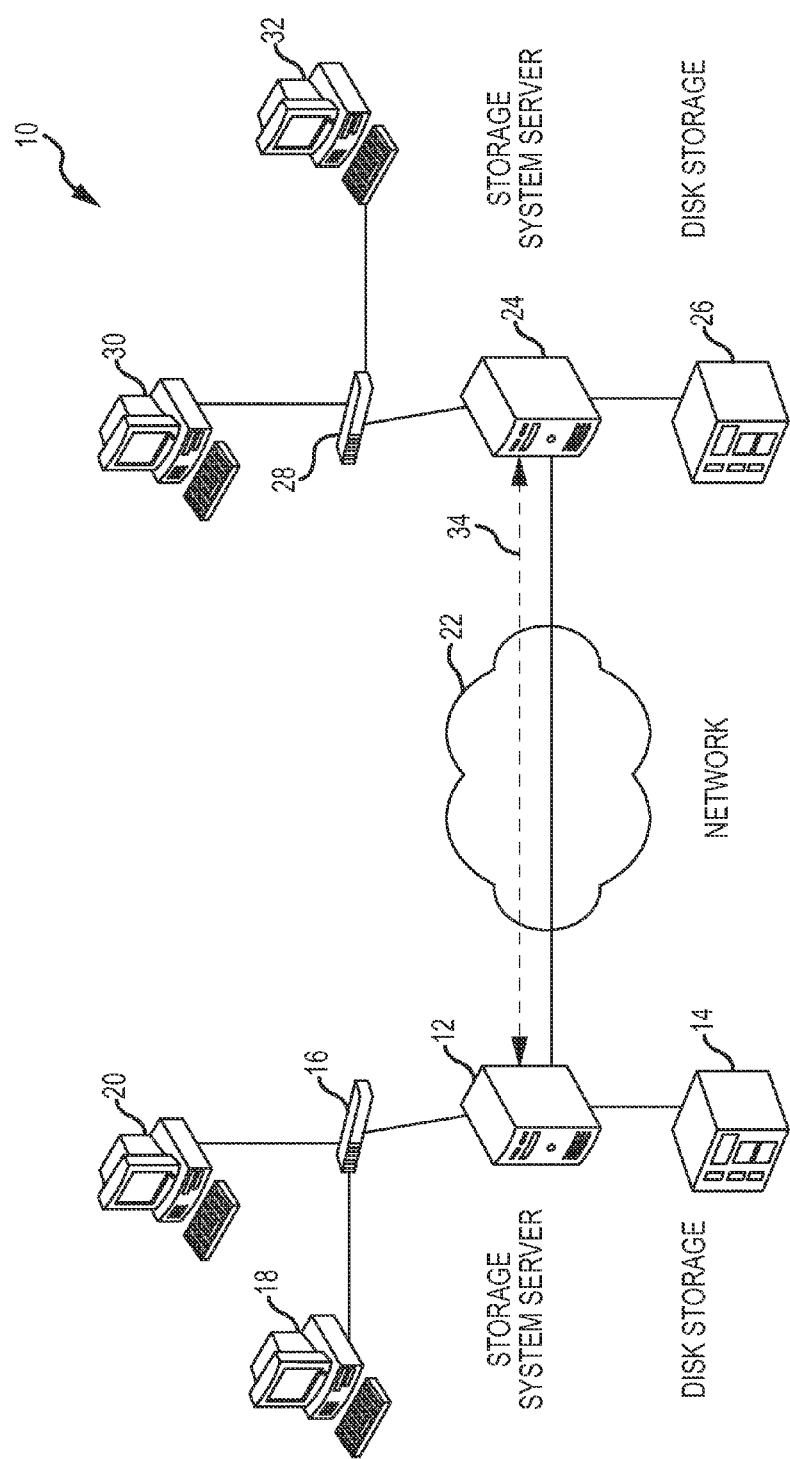
FIG. 1 illustrates an exemplary computing environment in which aspects of the present invention may be implemented.

Turning now to FIG. 1, exemplary architecture 10 of data storage systems (e.g., virtual tape systems) in a computing environment is depicted. Architecture 10 provides storage services to local hosts 18 and 20, and replicate data to remote data storage systems as shown. A local storage system server 12 in communication with a storage device 14 is connected to local hosts 18 and 20 over a network including components such as Fibre channel switch 16. Fibre channel switch 16 is capable, for example, of executing commands (such as small computer systems interface (SCSI) commands) for tape devices. The skilled artisan will appreciate that architecture 10 may include a variety of storage components. For example, storage devices 14 may include conventional hard disk drive (HDD) devices, or may include solid state drive (SSD) devices.

Local storage system server 12 is connected over network 22 to a remote storage system server 24. Remote server 24 communicates with a locally connected disk storage device 26, and with locally connected hosts 30 and 32 via another network and network component 28 such as Fibre channel switch 28. Network 22 may include a variety of network topologies, such as a wide area network (WAN), a local area network (LAN), a storage area network (SAN), network attached storage (NAS), scaled-out network attached storage (SoNAS), and other configurations. Similarly, switches 16 and 28 may include other types of network devices. In an alternate embodiment, switches 16 and 28 are Ethernet switches, Fibre-Channel over Ethernet (FCoE) switches, or Infiniband Switches.

Architecture 10, as previously described, provides local storage services to local hosts, and provides replicate data to the remote data storage systems (as denoted by data replication functionality using arrow 34). As will be described, various embodiments of the present invention and claimed subject matter may be implemented on architectures such as architecture 10. For example, in one embodiment, the disk storage device 14 may be part of a deduplicated storage system, storing deduplicated data entities. The deduplicated data entities may then undergo a data replication process 34 whereby the deduplicated data entities are replicated on the remote disk storage device 26. One of ordinary skill in the art will appreciate that other system architectures may implement aspects of the present invention.

Figure 2:
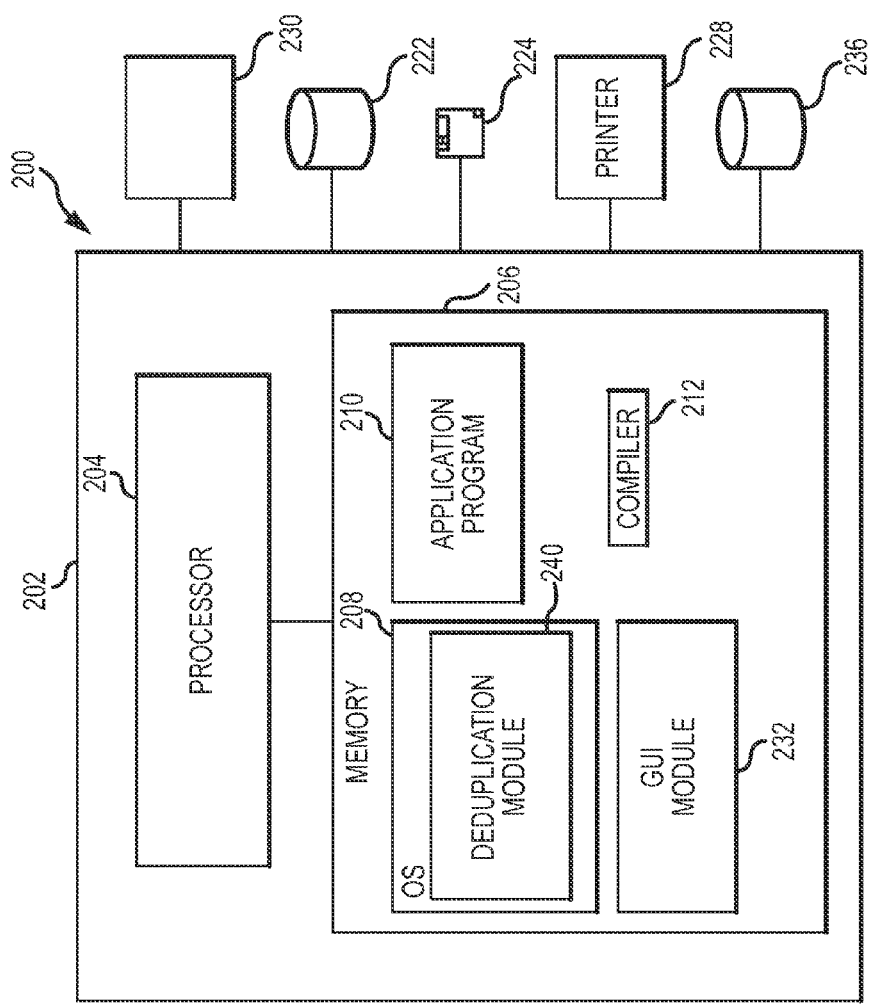
FIG. 2 illustrates an exemplary computing device including a processor device in a computing environment such as the computing environment shown in FIG. 1.

FIG. 2 illustrates a portion 200 of an exemplary computer environment that may be used to implement embodiments of the present invention. A computer 202 comprises a processor 204 and a memory 206, such as random access memory (RAM). In one embodiment, storage system server 12 (FIG. 1) may include components similar to those shown in computer 202. The computer 202 is operatively coupled to a input/output accessories (not shown), such as a display, which presents images such as windows to the user on a graphical user interface, a keyboard, a mouse device, a printer 228, etc. Of course, those skilled in the art will recognize that any combination of the above components, or any number of different components, peripherals, and other devices, may be used with the computer 202.

Generally, the computer 202 operates under control of an operating system (OS) 208 (e.g. z/OS, OS/2, LINUX, UNIX, AIX, WINDOWS, MAC OS) stored in the memory 206, and interfaces with the user to accept inputs and commands and to present results, for example through a graphical user interface (GUI) module 232. In one embodiment of the present invention, the OS 208 facilitates the backup mechanisms. Although the GUI module 232 is depicted as a separate module, the instructions performing the GUI functions can be resident or distributed in the operating system 208, the application program 210, or implemented with special purpose memory and processors. OS 208 includes a deduplication module 240 which may be adapted for carrying out deduplication processes and mechanisms. As used herein, the term "deduplication" is defined as a process for deleting redundant data in a database, storing a single master copy of the data, and replacing the redundant data with a reference pointer to a master copy. In addition to performing deduplication, deduplication module 240 may be further adapted for minimizing discontinuity of physical blocks the during deduplication process.

Deduplication module 240 may be implemented in hardware, firmware, or a combination of hardware and firmware. In one embodiment, deduplication module 240 may be embodied as an application specific integrated circuit (ASIC). As the skilled artisan will appreciate, functionality associated with the deduplication module 240 may also be embodied, along with the functionality associated with the processor 204, memory 206, and other components of computer 202. Further, the functionality associated with deduplication module 240 (or again, other components of the computer 202) may be implemented as a field programmable gate array (FPGA).

As depicted in FIG. 2, the computer 202 includes a compiler 312 that allows an application program 310 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, Ethernet card, wireless link or other device for communicating with other computers, e.g. via the Internet or other network.

Data storage device 222 is a direct access storage device (DASD) 222, including one or more primary volumes holding a number of datasets. DASD 222 may include a number of storage media, such as hard disk drives (HDDs), tapes, and the like. Data storage device 236 may also include a number of storage media in similar fashion to device 222. Device 236 may be designated as a backup device 236 for holding backup versions of the number of datasets primarily stored on the device 222. As one of ordinary skill in the art will appreciate, devices 222 and 236 need not be located on the same machine. Devices 222 may be located in geographically different regions, and connected by a network link such as Ethernet. Devices 222 and 236 may include one or more volumes, with a corresponding volume table of contents (VTOC) for each volume.

Figure 3:
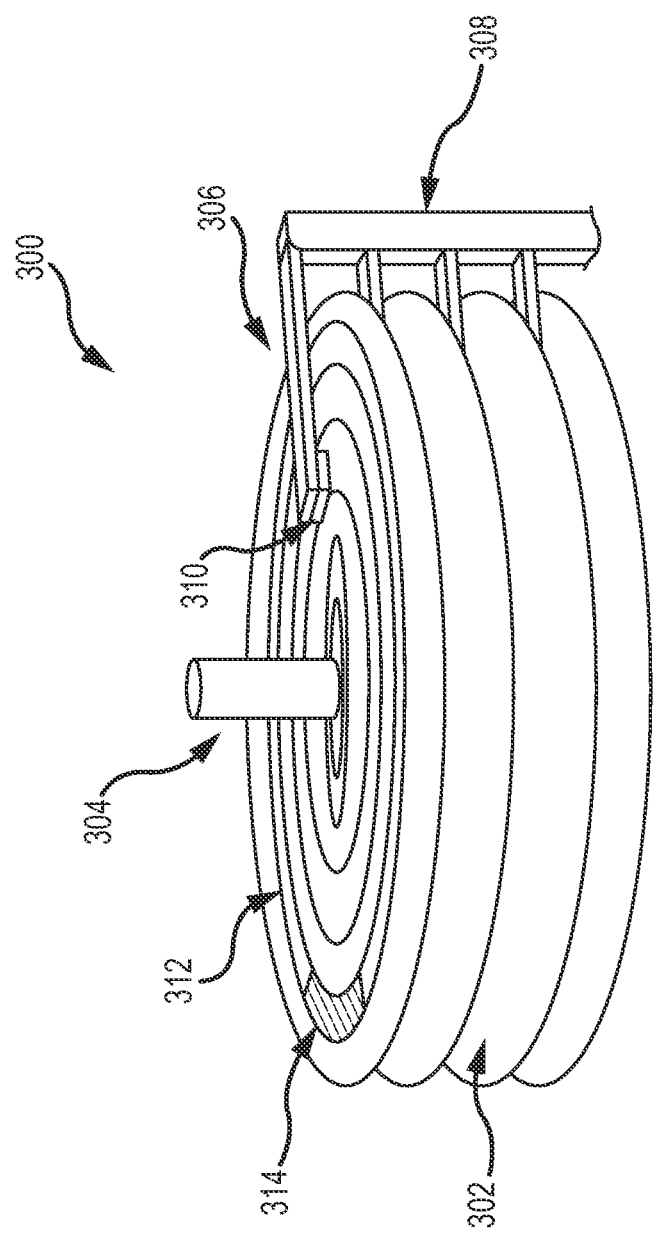
FIG. 3 illustrates an exemplary magnetic hard disk for use in a computing device such as the computing device shown in FIG. 2.

FIG. 3 illustrates a hard disk drive 300 that can be implemented as one or more of storage 14 (FIG. 1) or devices 222 or 236 (FIG. 2). Drive 300 is a magnetic hard disk drive and includes a plurality of disk platters 302 that are disposed on top of each other to form a stack. Each platter 302 is divided into concentric tracks 306, and each track 312 includes one or more sectors 308. Tracks 306 and sectors 308 are used for identifying physical locations or blocks at which data is stored.

Platters 302 are mounted on a disk spindle 304 allowing each platter to rotate around spindle 304. Actuator arms 306 for each platter 302 extend from a common actuator axis 308 located at an outer diameter of platters 302. Each arm 306 includes a read/write head 310 at its free end that operates near the surface of a corresponding platter 302. Arms 306 each move on an arc that moves substantially radially across platters 302 as they spin allowing each head 310 to access almost an entire surface of corresponding platter 302. In particular, as head 310 is used to read or write data on platters 302, head 310 is moved from track 312 to track 312 and/or from sector 314 to sector 314. In some instances, a file is stored on different platters 302 and one head 310 of a corresponding platter 302 accesses a sector 314 in a track 312 and then moves to another head 310 of a different corresponding platter 302 to access a sector 314 in a track 312.

To optimize available physical storage and to reduce input/output latencies, high read blocks are identified and stored in a physically contiguous manner on storage 14 (FIG. 1) or devices 222 or 236 (FIG. 2). In particular, a ReadClusterCreate routine is invoked to identify high read blocks referred to by multiple applications. For example, a number of reads is monitored for each physical block by keeping track of the number of reads on each logical block. The ReadClusterCreate routine runs to group the high read blocks together into blocks sets that are referred to by common applications. If the blocks making up the block sets are not contiguous, the data stored on the blocks are then relocated so that the data contained on the set of blocks are physically contiguous. In an embodiment, the data stored on the blocks is swapped with data on different blocks that are physically contiguous. Data swapping can be invoked periodically or at the time of block allocation during deduplication. Grouping the high read data together at physically contiguous blocks reduces disk spindle rotation overhead and read/write arm movements, which consequently reduces I/O latencies and improves I/O performance.

Figure 4:
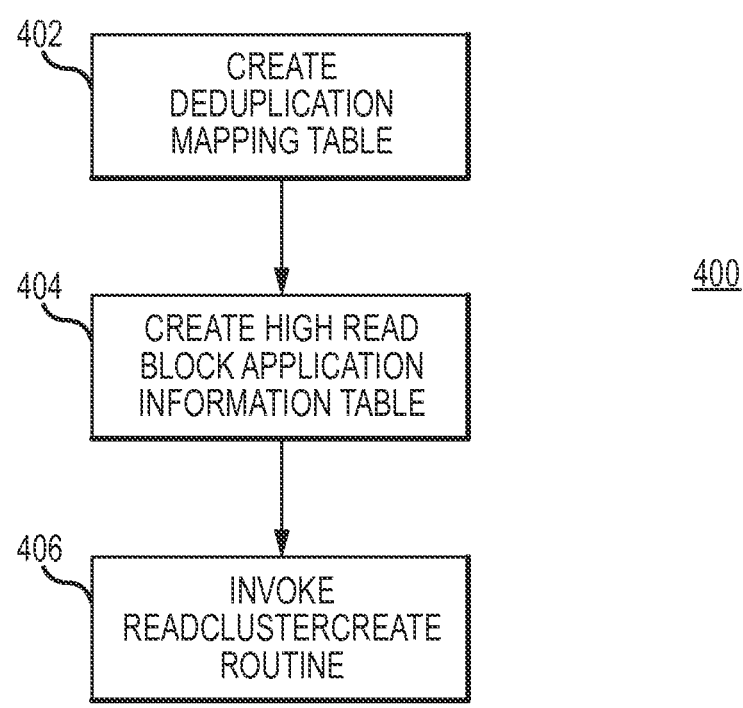
FIG. 4 is a flow diagram of a method of high read block clustering at a deduplication layer, according to an embodiment.

The ReadClusterCreate routine can be performed as part of commands given to deduplication module 240 and includes generally, deduplication mapping, high read block identification, and high read block relocation. FIG. 4 is a flow diagram of a method 400 of high read block clustering at a deduplication layer (or the ReadClusterCreate routine), according to an embodiment. Method 400 begins by creating a deduplication mapping table at 402. The deduplication mapping table, also referred to as "Table 1", is maintained by deduplication module 240 or implemented as a separation operation and accessed by deduplication module 240. Next, a high read block application information table, also referred to as "Table 2", is created at 404. Then, a ReadClusterCreate routine is invoked at 406. Each of these steps will now be discussed in detail below.

To create the deduplication mapping table or Table 1, entries are included for each physical block or disk block and data is obtained for each relating to the status of each disk, a hash value, a listing of the logical blocks, and the number of reads on each disk block. The physical block or disk block column indicates each block on a physical storage device. Thus, for example, in the case of magnetic hard drive disk 300, each physical block or disk block is a particular sector 314 on a track 312 of a given disk or platter 302 or for other physical locations on a particular storage device. In other embodiments, such as for tapes, the physical block is a particular location on a particular tape reel. The status column indicates whether the disk block is free to be assigned or allocated to a logical block or whether the disk block has already been allocated to a logical block. The hash value column includes hash values that are generated by deduplication module 240 for each disk block using an existing hash function such as SHA-1, a Secure Hash Algorithm, or another algorithm. The hash value generated for each disk block is used for determining whether other disk blocks have the same hash value. The listing of logical blocks column includes those logical blocks that refer to the disk block in the entry, and the read count column increments each time the disk block is read.

A sample TABLE 1 is provided below, according to an embodiment.

TABLE 1

| DISK BLOCK | STATUS | HASH VALUE | LOGICAL BLOCK | READ COUNT |
|---|---|---|---|---|
| 0 | Allocated | 1123da12e34 | Lblock0 Lblock100 | 100 |
| 10 | Allocated | 345b55689dac | Lblock1 Lblock3 | 120 |
| 20 | Allocated | 678456ecfba | Lblock2 | 140 |
| 30 | Freed | — | — | — |
| 40 | Allocated | 37891654abc | Lblock3 Lblock5 | 50 |
| 50 | Freed | — | — | — |

As depicted, each disk block (e.g., 0, 10, 20, 30, 40, and 50) has a separate entry. Disk blocks indicate different physical blocks on a physical memory device (e.g., magnetic hard disk drive 300 or devices 222 or 236). Some of the disk blocks are depicted as being allocated to logical blocks (e.g., disk blocks 0, 10, 20, and 40) and others are depicted as not yet being allocated to logical blocks or freed (e.g., disk blocks 30 and 50), as denoted in the status column.

Hash values, as mentioned previously are generated for each disk block, and in particular, are computed for any write request on a logical block. If the computed hash value matches an existing entry in Table 1, the entry is added as an increment to the ReadCount column and a disk write for the write request is not performed. If the computed hash value does not match an existing entry in Table 1, then deduplication module 240 searches for and assigns a free physical block or disk block to the new hash value, and adds a new entry to Table 1 including the disk block, "allocated" status, the new hash value, the logical blocks associated with the disk block, and a ReadCount value of 1. The disk write for the new hash value is then performed on the disk at the disk block. During a read request, Table 1 is referred to for obtaining an associated disk block. The read operation is performed in response to the read request, and the ReadCount entry is incremented.

Figure 5:
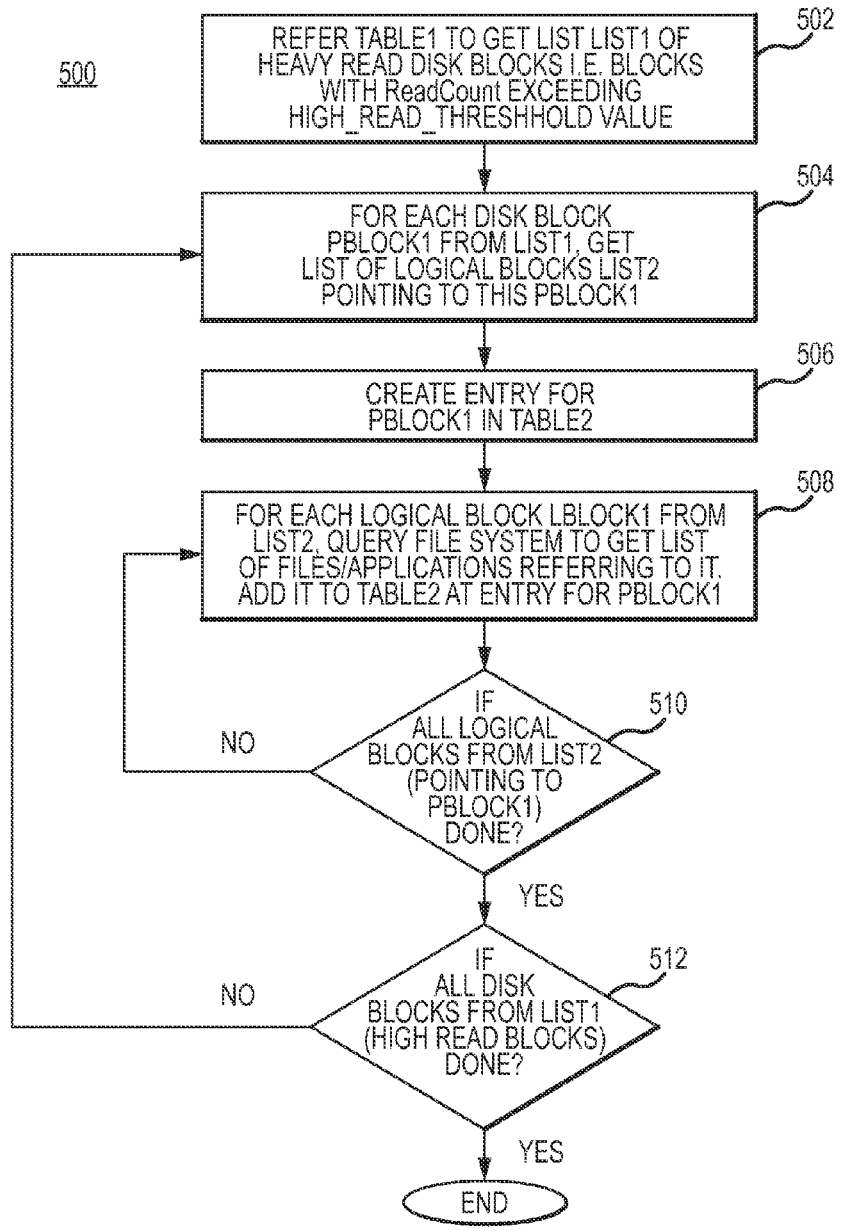
FIG. 5 is a flow diagram of a method for creating a high read block application information table, according to an embodiment.

After the deduplication mapping table is created, a high read block application information table is created at 404. FIG. 5 is a flow diagram of a method 500 for creating the high read block application information table (also referred to as "Table 2"), according to an embodiment. Table 1 is referred to to create a list ("LIST1") of heavy read disk blocks at 502. The heavy read disk blocks are those disk blocks where the ReadCount value exceeds a threshold value. For each disk block ("PBLOCK1") from LIST1, a list of logical blocks ("LIST2") is created including logical blocks that point to the corresponding disk block (PBLOCK1) at 504. An entry is created for each disk block PBLOCK1 in Table 2 at 506. For each logical block ("LBLOCK1") from LIST2, a query is made to the file system to get a list of files and/or applications referencing the corresponding logical blocks LBLOCK1 and each file and/or application referencing the corresponding logical blocks is added to Table 2 at 508. A determination is then made as to whether all logical blocks from LIST2 (those blocks pointing to PBLOCK1) have been reviewed at 510. If not, method 500 returns to 508. If so, a determination is made as to whether all disk blocks PBLOCK1 from LIST1 have been reviewed at 512. If not, method 500 iterates at 504. If so, method 500 ends.

TABLE 2 below is an example of a high read block application information table according to an embodiment.

TABLE 2

| DISK BLOCK | LIST OF APPLICATIONS REFERRING |
| --- | --- |
| 0 | File 1, File 2 |
| 10 | File 1, File 3 |
| 20 | File 3 |

In an embodiment, a threshold value is set at 100, and TABLE 2 shows the listing of application referred to for high read blocks 0, 10, and 20, which as shown in TABLE 1 above each have ReadCounts above 100.

Figure 6:
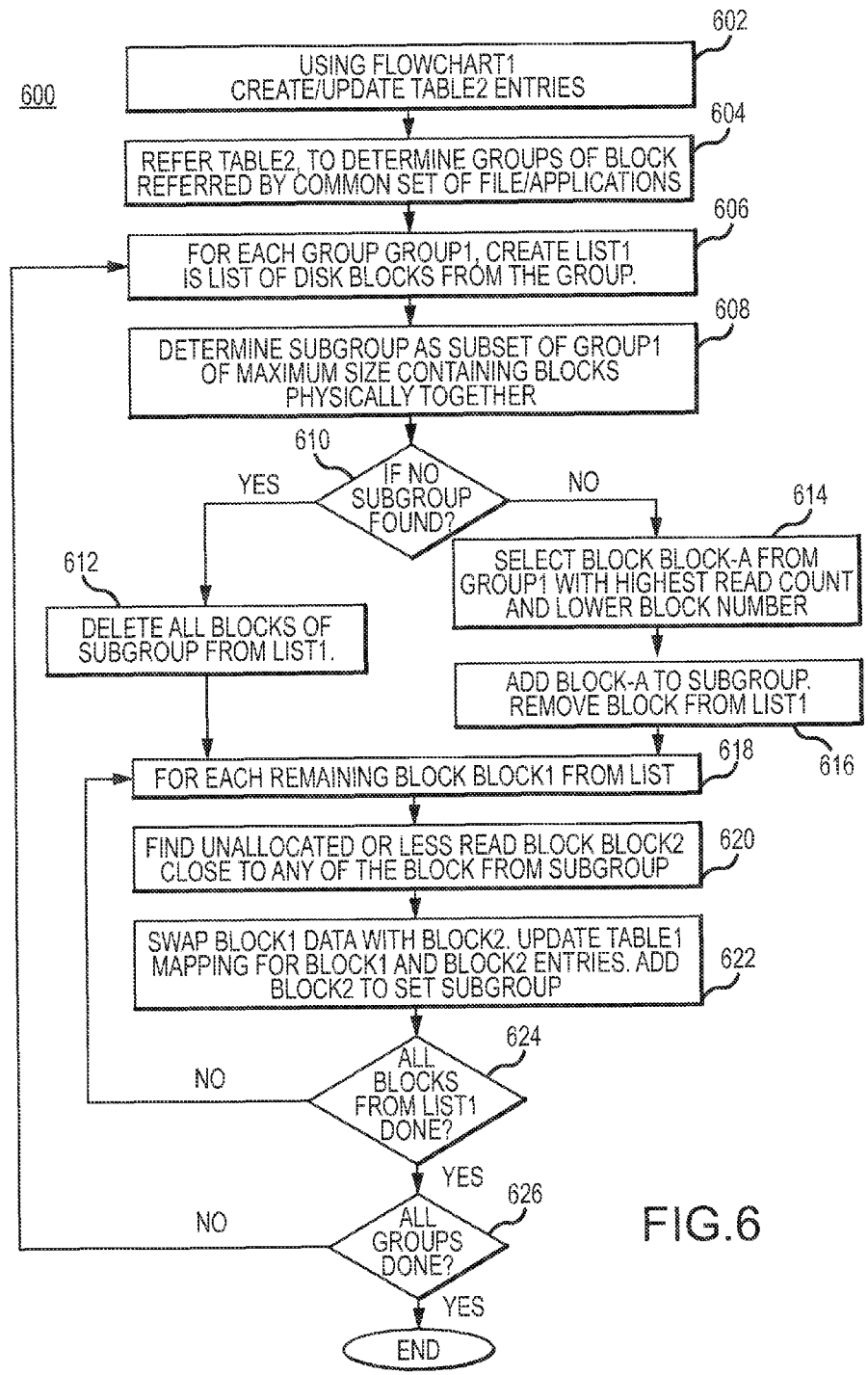
FIG. 6 is a flow diagram of a method of performing a ReadClusterCreate routine, according to an embodiment.

Subsequent to creating the high read block application information table at 404, a ReadClusterCreate routine is invoked at 406. FIG. 6 is a flow diagram of a method 600 of performing the ReadClusterCreate routine, according to an embodiment. At 602, Table 2 entries (i.e., entries in the high read block application information table) are updated. Referring to Table 2, groups of blocks referred to by common sets of files and/or applications are identified at 604. Thus, files and/or applications that refer to the same blocks are grouped together. For each identified group ("GROUP1"), a LIST1 is created of the disk blocks included in each group at 606. Next, a subset of the identified group GROUP1 having the most blocks that are physically contiguous is determined at 608. A determination is made as to whether a SUBGROUP already exists at 610. If no subgroup is found, method 600 continues at 612 where all blocks of SUBGROUP are deleted from LIST1 at 612. If a subgroup is found at 610, the disk block having the highest read count and the lowest block number ("BLOCK-A") is selected from GROUP1 at 614, then BLOCK-A is added to SUBGROUP and removed from LIST1 at 616.

No matter the outcome at 610, method 600 continues at 618 where each remaining block BLOCK1 from LIST1 is examined. Unallocated or less read blocks ("BLOCK2") close to any of the blocks from SUBGROUP are then identified at 620. BLOCK1 data is swapped with data, if any, at BLOCK2 at 622, Table 1 is updated to include the changed of mapping for BLOCK1 and BLOCK2, and BLOCK2 is added to SUBGROUP. Next, a determination is made as to whether all blocks from LIST1 have been reviewed at 624. If not, method 600 iterates at 618. If so, method 600 continues at 626 where a determination is made as to whether a review of all groups have been completed. If not, method 600 iterates at 606. If so, method 600 ends.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

For example, in one embodiment, instructions implementing the operating system 208, the computer program 210, and the compiler 212 are tangibly embodied in a computer-readable medium, e.g., data storage device 220, which may include one or more fixed or removable data storage devices 224, such as a zip drive, floppy disk, hard drive, compact disc (CD), digital versatile disk (DVD), blu-ray disc (BD), digital tape, flash memory card, solid state drive, etc., which are generically represented as the storage device 224. Further, the operating system 308 and the computer program 210 comprise instructions which, when read and executed by the computer 202, cause the computer 202 to perform the steps necessary to implement and/or use the present invention. For example, the computer program 210 may comprise instructions for implementing the deduplication process, which will be described in more detail below. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Embodiments of the present invention may include one or more associated software application programs 310 that include, for example, functions for managing a distributed computer system comprising a network of computing devices, such as a storage area network (SAN). Accordingly, processor 304 may comprise a storage management processor (SMP). The program 310 may operate within a single computer 302 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.)

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A method of deduplicating data comprising:
   mapping a plurality of file blocks of selected data to a plurality of logical blocks;
   deduplicating the plurality of logical blocks to thereby associate each logical block with a corresponding physical block of a plurality of physical blocks located on a physical memory device, two or more of the corresponding physical blocks being non-contiguous with each other;
   creating a deduplication table and a frequently accessed application information table, wherein the deduplication table includes information about a disk block comprising different physical blocks, a logical block allocation status of the disk block, a hash value for the disk block, information as to which logical blocks reference the disk block, and a count of read operations of the disk block, and wherein the frequently accessed application information table includes information about the disk block and a list of applications that reference the disk block;
   determining whether one or more of the corresponding physical blocks are one or more frequently accessed physical blocks being accessed at a frequency above a threshold frequency and being referred to be a common set of applications using the frequently accessed application information table; and
   grouping the one or more frequently accessed physical blocks that are identified using the frequently accessed application information table that are above the threshold frequency and being referred to by the common set of applications together onto physically contiguous blocks, wherein if at least one of the one of more frequently accessed physical blocks that are grouped together are not physically contiguous:
      relocating data stored at the at least one of the one or more frequently accessed physical blocks that are not physically contiguous to different ones of the plurality of physical blocks that are physically contiguous, wherein relocating data stored at the at least one of the one or more frequently accessed physical blocks that are not physically contiguous occurs during deduplicating the plurality of logical blocks.

2. The method of claim 1, wherein the step of deduplicating includes computing a hash value for each logical block of the plurality of logical blocks and matching the hash value to an entry including the same hash value to thereby associate each logical block with the corresponding physical block.

3. The method of claim 2, wherein the step of deduplicating further includes assigning one or more unassigned physical blocks to one or more of the logical blocks, if the hash value does not match any entry.

4. The method of claim 1, further comprising identifying one or more files that refer to the one or more frequently accessed physical blocks.

5. The method of claim 1, wherein the step of determining includes tracking reads on each of the logical blocks of the plurality of logical blocks.

6. The method of claim 1, wherein the different ones of the plurality of physical blocks being physically contiguous are located sequentially on the same track of the physical memory device.

7. The method of claim 1, wherein the different ones of the plurality of physical blocks being physically contiguous are located adjacent to each other on different tracks of the physical memory device.

8. The method of claim 1, wherein at least a portion of the different ones of the plurality of physical blocks previously included data accessed at a frequency below a threshold frequency.

9. A system for deduplicating data comprising:
one or more physical memory devices; and
a processing device operable with the one or more physical memory devices to:
map a plurality of file blocks of selected data to a plurality of logical blocks,
deduplicate the plurality of logical blocks to thereby associate each logical block with one or more corresponding physical blocks of a plurality of physical blocks located on the one or more physical memory devices, two or more of the corresponding physical blocks being non-contiguous with each other,
create a deduplication table and a frequently accessed application information table, wherein the deduplication table includes information about a disk block comprising different physical blocks, a logical block allocation status of the disk block, a hash value for the disk block, information as to which logical blocks reference the disk block, and a count of read operations of the disk block, and wherein the frequently accessed application information table includes information about the disk block and a list of applications that reference the disk block,
determine whether one or more of the corresponding physical blocks are one or more frequently accessed physical blocks being accessed at a frequency above a threshold frequency and being referred to by a common set of applications using the frequently accessed application information table, and
group the one or more frequently accessed physical blocks that are identified using the frequently accessed application information table that are above the threshold frequency and being referred to by the common set of applications together onto physically contiguous blocks, wherein if at least one of the one or more frequently accessed physical blocks that are grouped together are not physically contiguous:
relocate data stored at the at least one of the one or more frequently accessed physical blocks that are not physically contiguous to different ones of the plurality of physical blocks that are physically contiguous, wherein relocating data stored at the at least one of the one or more frequently accessed physical blocks that are not physically contiguous occurs during deduplicating the plurality of logical blocks.

10. The system of claim 9, wherein the processing device is further operable to compute a hash value for each logical block of the plurality of logical blocks and match the hash value to an entry including the same hash value to thereby associate each logical block with the corresponding physical block.

11. The system of claim 10, wherein the processing device is further operable to assign one or more unassigned physical blocks to the one or more logical blocks, if the hash value does not match any entry.

12. The system of claim 9, the processing device is further operable to identify one or more files that refer to the one or more frequently accessed physical blocks.

13. The system of claim 9, the processing device is further operable to track reads on each of the logical blocks of the plurality of logical blocks.

14. The system of claim 9, wherein the different ones of the plurality of physical blocks being physically contiguous are located sequentially on the same track of the same physical memory device.

15. The system of claim 9, wherein the different ones of the plurality of physical blocks being physically contiguous are located adjacent to each other on different tracks of the same physical memory device.

16. The system of claim 9, wherein at least a portion of the different ones of the plurality of physical blocks previously included data accessed at a frequency below a threshold frequency.

17. A computer program product for deduplicating data comprising at least one non-transitory computer-readable medium having computer-readable code portions comprising:
a first executable portion for mapping a plurality of file blocks of selected data to a plurality of logical blocks;
a second executable portion for deduplicating the plurality of logical blocks to thereby associate each logical block with a corresponding physical block of a plurality of physical blocks located on a physical memory device, two or more of the corresponding physical blocks being non-contiguous with each other;
a third executable portion for creating a deduplication table and a frequently accessed application information table, wherein the deduplication table includes information about a disk block comprising different physical blocks, a logical block allocation status of the disk block, a hash value for the disk block, information as to which logical blocks reference the disk block, and a count of read operations of the disk block, and wherein the frequently accessed application information table includes information about the disk block and a list of applications that reference the disk block;
a fourth executable portion for determining whether one or more of the corresponding physical blocks are one or more frequently accessed physical blocks being accessed at a frequency above a threshold frequency and being referred to by a common set of applications using the frequently accessed application information table; and
a fifth executable portion for grouping the one or more frequently accessed physical blocks that are identified using the frequently accessed application information table that are above the threshold frequency and being referred to by the common set of applications together onto physically contiguous blocks, wherein if at least one of the one or more frequently accessed physical blocks that are grouped together are not physically contiguous:

relocating data stored at the at least one of the one or more frequently accessed physical blocks that are not physically contiguous to different one of the plurality of physical blocks that are physically contiguous, wherein relocating data stored at the at least one of the one or more frequently accessed physical blocks that are not physically contiguous occurs during deduplicating the plurality of logical blocks.

18. The computer program product of claim 17, wherein the second executable portion includes instructions for computing a hash value for each logical block of the plurality of logical blocks and matching the hash value to an entry including the same hash value to thereby associate each logical block with the corresponding physical block.

19. The computer program product of claim 18, wherein the third executable portion includes instructions for assigning one or more unassigned physical blocks to the one or more logical blocks, if the hash value does not match any entry.

20. The computer program product of claim 18, further comprising a sixth executable portion for identifying one or more files that refer to the one or more frequently accessed physical blocks.

21. The computer program product of claim 18, wherein the third executable portion includes instructions for tracking reads on each of the logical blocks of the plurality of logical blocks.

22. The computer program product of claim 18, wherein the different ones of the plurality of physical blocks being physically contiguous are located sequentially on the same track of the physical memory device.

23. The computer program product of claim 18, wherein the different ones of the plurality of physical blocks being physically contiguous are located adjacent to each other on different tracks of the physical memory device.

* * * * *